Aug. 14, 1962  J. A. COX, JR  3,049,646
MOUNTING ARRANGEMENT FOR AN ELECTRICAL DEVICE
Filed April 3, 1959
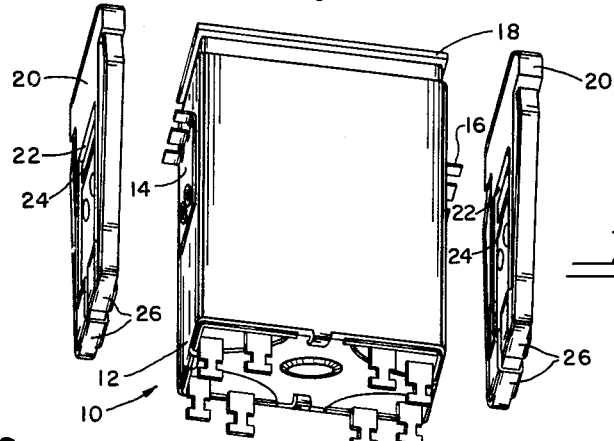
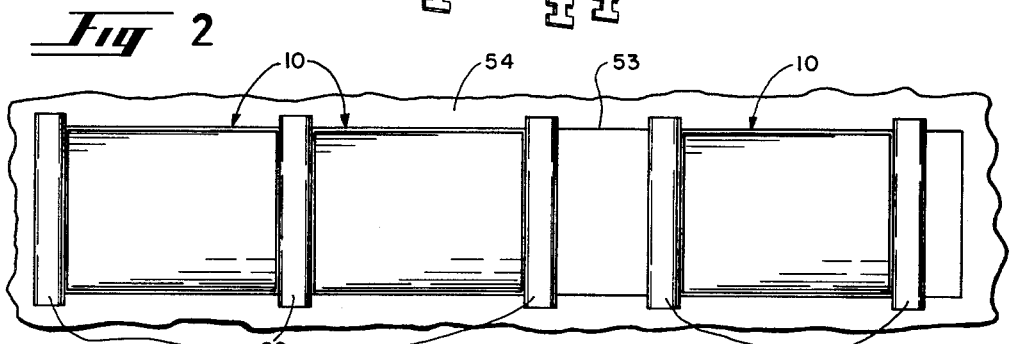
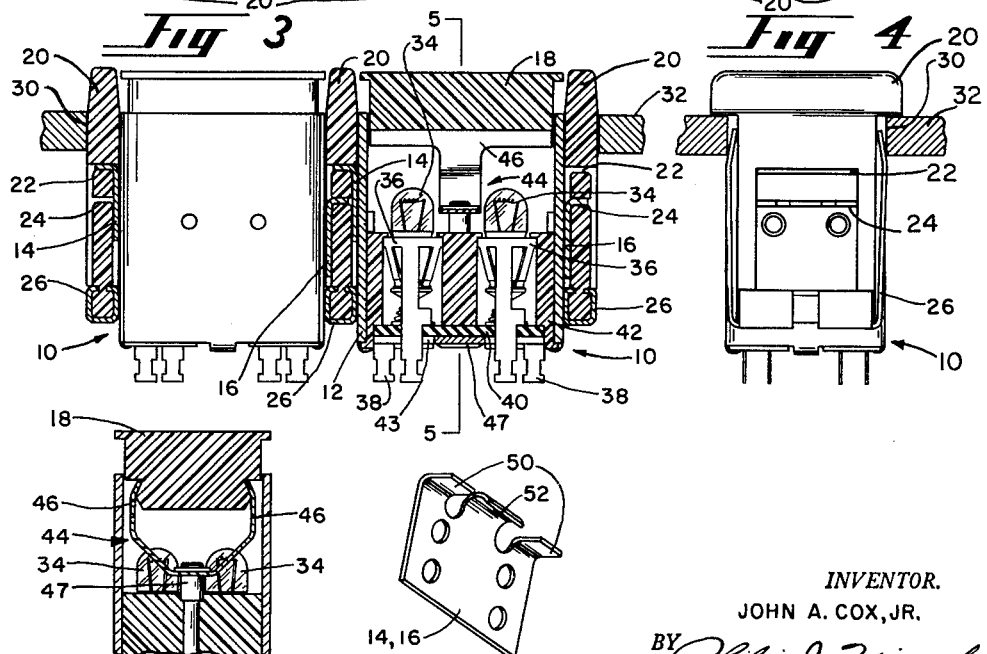
INVENTOR.
JOHN A. COX, JR.
BY
ATTORNEY

United States Patent Office 3,049,646
Patented Aug. 14, 1962

3,049,646
MOUNTING ARRANGEMENT FOR AN ELECTRICAL DEVICE
John A. Cox, Jr., Freeport, Ill., assignor to Minneapolis-Honeywell Regulator Company, Minneapolis, Minn., a corporation of Delaware
Filed Apr. 3, 1959, Ser. No. 803,850
8 Claims. (Cl. 317—99)

The present invention is generally directed to a mounting arrangement for an electrical device, such as a signal means or a switch of the type wherein independent mounting members are arranged to straddle the device and further are arranged to be fastened thereto by means of a detent fastening arrangement and whereby the resulting unitary structure can be disposed in an opening in a support member or a mounting panel by means of a detent arrangement associated with the unitary structure without conventional fastening means being associated with the electrical device per se and without the necessity of utilizing tools of any kind.

Further the present invention is directed to a mounting arrangement of the type set forth above for a plurality of electrical devices which can be ganged together with a mounting member disposed between adjacent devices so that the mounting member acts as a separator between adjacent devices and so that the resulting unitary structure can be disposed in a single opening in a support member, again, without conventional fastening means being associated with the electrical device per se and without the necessity of utilizing tools of any kind.

The idea of mounting an electrical device to a support member without the utilization of conventional fastening means being associated with the electrical device per se by means of mounting members is shown in the Campe et al. Patent 2,935,653, assigned to the present assignee. While the disclosure of the Campe et al. patent includes a very definite number of advantages both for mounting a single electrical device and for gang mounting a plurality of electrical devices to a support member, the arrangement requires "behind the panel" manipulation with respect to the mounting members and utilization of tools in order to secure the device or devices, as the case may be, to the support member. This is because the electrical device in Campe et al. is maintained as a prisoner between the back of the support member and a portion of the mounting member. Further, the mounting members of Campe et al. are not operatively fastened to the device or devices when the device or devices and the mounting members are not associated with the support member thereby introducing loose pieces and the problems they present.

In the disclosure of the present invention, the mounting members include openings for co-operation with mounting tabs located on the electrical device so that when assembled a detenting action is set up therebetween maintaining the mounting members and the device as a unitary structure. The mounting members include detent members for co-operation with an opening in the support member so that the unitary structure can be inserted into and removed from the support member by merely pushing the unitary structure into and pulling the unitary structure out of the opening in the support member. It will thus be appreciated that no loose pieces are encountered nor are any tools required either for assembling the mounting members to the electrical device or for inserting or removing the unitary structure from the support member, and installation of the unitary structure onto and removal of the unitary structure for servicing or replacement from the support member is an extremely simple operation. In a similar manner, the present invention allows for the gang mounting of a plurality of electrical devices and a mounting member disposed between adjacent devices in a single opening in the support member.

It is, therefore, an object of the present invention to provide a mounting arrangement for an electrical device including mounting members arranged to be fastened onto said device by means of a detent fastening arrangement and the assembly arranged to be held in place in an opening in a support member by a detent action therebetween.

It is another object of the present invention to provide an arrangement as above set forth wherein no loose pieces are encountered whether the combination comprised of the electrical device and the mounting members is disposed in the support member or not.

A further object of the present invention is to provide an arrangement as above set forth which requires no tools of any kind to either assemble the mounting members to the electrical device or to dispose or remove the resulting unitary structure from the support member.

Still another object of the present invention is to provide an arrangement as above set forth wherein no conventional screw fasteners are required either to hold the mounting members to the electrical device or the resulting unitary structure to the support member.

Another further object is to provide a mounting arrangement for a plurality of electrical devices including a mounting member disposed between adjacent devices to act as a separator which can be disposed in and removed from a single opening in a support member as a unitary structure.

These and other objects will become more apparent from a reading of the following specification and appended claims taken in connection with the drawing in which:

FIGURE 1 is a perspective view of an electrical device and a pair of mounting members therefor;

FIGURE 2 is a view of plurality of electrical devices disposed in a support member and supported therefrom by a plurality of mounting members;

FIGURE 3 is a view, partially in section, of a pair of electrical devices associated with a plurality of mounting members, the entire assembly supported from a support member;

FIGURE 4 is an end view of the arrangement of FIGURE 3;

FIGURE 5 is a partial sectional view taken along lines 5—5 of FIGURE 3; and

FIGURE 6 is an enlarged perspective view of a mounting tab for the electrical device.

In FIGURE 1, an electrical device in the form of a signal means 10 is disclosed including a housing 12 having a mounting tab 14 and a mounting tab 16 secured to opposite side walls thereof and having a button 18 of light transmitting material partially disposed in an opening, not shown, in the housing 12 and partially extending therefrom. The mounting tabs 14 and 16 are located at different elevations on the housing 12 for reasons which will become more apparent below. Disposed on either side of and proximate to the signal means 10 are a pair of mounting members 20 of T-shape having two narrow openings 22 and 24 extending therethrough for co-operation with the mounting tabs 14 and 16 as will be more fully explained below. Each mounting member 20 includes a pair of spring fingers 26, one extremity of which is secured to the lower portion of the mounting member and the other extremity of which is free to move in the area of the upper portion of the mounting member.

In FIGURES 3 and 4, a unitary structure, comprised of a pair of signal means 10 having a mounting member 20 disposed therebetween and a pair of mounting members 20 disposed adjacent to the outer side walls thereof, is disposed in a complementary opening 30 in a support member 32 with the upper portions of the mounting members spanning the opening and thereby locating the unitary structure in the support member.

One of the signal means 10 in FIGURE 3 is shown in section disclosing a plurality of electric lamps 34 secured in sockets 36 and associated with terminals 38 supported from base member 40 which in turn is supported from the housing 12 along with insulator block 42 and plate 43. Referring concurrently also to FIGURE 5, button 18 is secured to a yoke member 44 having resilient arms 46, which yoke member is appropriately secured to shaft 47 which in turn serves to maintain the block 42, base member 40 and plate 43 in place in assembly. With such a construction, the button 18 can be easily inserted into and removed from the arms 46 of the yoke member 44 to either change the button or service the lamps 34.

The mounting tabs 14 and 16 located on the signal means 10 are staggered insofar as their elevation on either side wall of the signal means is concerned. This is to allow as much contact as possible between the tangs of the mounting tabs 14 and 16 and the narrow openings 22 and 24 in the mounting member 20. The construction of the mounting tabs 14 and 16 is best shown in the enlarged perspective view of FIGURE 6. The mounting tabs 14 and 16 include a pair of straight tangs 50 and a formed tang 52. The tangs 50 and 52 have a certain amount of resilience and the narrow openings 22 and 24 in the mounting member 20 are of such a dimension that the mounting members can be resiliently fastened to the signal means 10 by a detent action being set up between the tangs and the narrow openings.

The upper portions of the spring fingers 26 disposed on opposite sides of the mounting members 20 exhibit a certain degree of resilience so that a pair of signal means 10 with the appropriate number of mounting members can be disposed in the opening 30 in the support member 32 by merely pushing the resulting unitary structure therein. Similarly, the unitary structure can be removed from the support member 32 by merely pulling it away therefrom. It will be noted that to dispose the unitary structure into and remove the unitary structure from the support member 32, no manual manipulation behind the support member is required. Because of the unique arrangement of the elements, as is best shown in FIGURE 4, a wide variance in the thickness of the support member 32 can be tolerated without interfering with the holding capacity of the detent action set up between the spring fingers 26 of the mounting members 20 and the opening 30 in the support member. Further, because of the manner in which the signal means 10 and the mounting members 20 are fastened to the support member 32, the buttons 18 always protrude the same distance from the front of the support member regardless of the thickness of the support member, inasmuch as the entire assembly is located from the front of the support member by the upper portions of the mounting member, as was mentioned above.

In FIGURE 2, a unitary structure comprised of a pair of signal means 10 and the appropriate number of mounting members 20 is shown disposed in an opening 53 of a support member 54 as well as a unitary structure comprised of a single signal means 10 and the appropriate number of mounting members 20. Because of the lack of conventional fastening means, such as screw fasteners, being associated with signal means 10, an arrangement of separate unitary structures in a single opening in a support member is possible.

As in the case of the disclosure of the Campe et al. patent, mentioned previously, the mounting members 20 serve to separate the signal means 10 so that the possibility of "piping" of light from one button 18 to the other is materially reduced. Further, if the signal means 10 is combined with switch means, which could be easily accomplished by supporting a switch module of the type shown in the Campe et al. patent, below the signal means to provide an illuminated pushbutton switch with the button 18 as the actuator, the possibility of misactuation of adjacent buttons is also materially reduced.

It will be noted that the manner in which the mounting members 20 are fastened to the signal means 10 insures against the mounting members tilting with respect thereto and thereby substantially eliminates the possibility of binding between the buttons 18 and the mounting members should the device be an illuminated pushbutton switch.

In view of the above it will be noted that the present invention allows for the single mounting or gang mounting of electrical devices by means of mounting members held thereto by a detent action, the resulting unitary structure being arranged to be disposed in an opening in a support member without the use of conventional fasteners by means of detent action set up between the unitary structure and the opening of the support member. This is accomplished without the utilization of tools of any kind or without manual manipulation behind the support member. Further, removal of the unitary structure from the support member for servicing or replacement of one of the signal means results in no loose parts.

While only a single embodiment of the invention has been disclosed herein, there are other embodiments possible. Therefore, the scope of the present invention should be determined from the following claims, in which I claim:

1. In a mounting arrangement for an electrical device, the combination comprising: a housing including electrical means associated therewith and having mounting tabs located on opposite side walls thereof; a member proximate to an end surface of and operatively fastened to said housing arranged to be disposed in a complementary opening in and forward of a support member; and a pair of mounting members arranged to be disposed on opposite sides of said housing and each including a first portion arranged to be located forward of and to span the opening in and to engage a surface of the support member and each further including a second portion arranged to be disposed through the opening in and rearward of the support member and having an opening in a side surface thereof arranged to accommodate a mounting tab of said housing; the openings of said mounting members and said mounting tabs being detented with respect to each other so as to provide a unitary structure comprised of said housing and said mounting members; said mounting members having a pair of spring fingers disposed proximate opposite end surfaces of the second portions of said mounting members and so arranged as to engage the opening in the support member with the unitary structure disposed therein to thereby resiliently secure the unitary structure to the support member.

2. In a mounting arrangement, the combination comprising: an electrical device including a portion arranged to be disposed in a complementary opening in a support member; and a pair of mounting members arranged to be disposed on opposite sides of said device and each including a first portion arranged to be located forward of and to span the opening in and to engage a surface of the support member and each further including a second portion; a pair of mounting tabs and a pair of openings associated with opposite side walls of said device and the second portions of said mounting members, said openings and said mounting tabs being detented with respect to each other so as to provide a unitary structure comprised of said device and said mounting members; said mounting members including spring means so arranged as to engage the opening on the support member with the unitary structure disposed therein to thereby resiliently secure the unitary structure to the support member.

3. In a mounting arrangement, the combination comprising: an electrical device including a portion arranged to be disposed in a complementary opening in a support member; and mounting means arranged to be disposed proximate said device including locating means arranged to be disposed forward of and to span the opening in and to engage a surface of the support member; further locating means associated with said device and said mounting means for positioning and resiliently fastening one with respect to the other so as to form a unitary structure; the unitary structure including detent means arranged so as to engage the opening in the support member with the unitary structure disposed therein to thereby resiliently secure the unitary structure to the support member.

4. In a mounting arrangement, the combination comprising: an electrical device including a portion arranged to be disposed in a complementary opening in a support member; and mounting means arranged to be disposed proximate said device; locating means associated with said device and said mounting means for positioning and resiliently fastening one with respect to the other so as to form a unitary structure; further locating means associated with the unitary structure arranged to be disposed forward of and to span the opening in and to engage a surface of the support member; said mounting means including detent means so arranged as to engage the opening in the support member with the unitary structure disposed therein to thereby resiliently secure the unitary structure to the support member.

5. In a mounting arrangement for a pair of electrical devices, the combination comprising: a first housing and a second housing arranged to be disposed adjacent each other each having electrical means associated therewith and each having mounting tabs located on opposite side walls thereof and each including a portion arranged to be disposed in a single complementary opening in and forward of a support member; and three mounting members, one each arranged to be disposed on either side of said first and second housings and one arranged to be disposed therebetween, said mounting members including first portions arranged to be located forward of and to span the opening in and to engage a surface of the support member and further including second portions arranged to be disposed through the opening in and rearward of the support member and having openings in side surfaces thereof arranged to accommodate the mounting tabs of said housing; the openings and mounting tabs being detented with respect to each other so as to provide a unitary structure comprised of said housings and said mounting members; a pair of openings provided in the second portion of the mounting member disposed between said housings each arranged to accommodate an appropriate mounting tab to allow the mounting tab to extend therethrough to thereby maximize the detent force provided between the openings in the mounting member and said mounting tabs; said mounting members including spring means arranged to engage the opening in the support member with the unitary structure disposed therein to thereby resiliently secure the unitary structure to the support member.

6. In a mounting arrangement, the combination comprising: a first electrical device and a second electrical device arranged to be disposed adjacent each other and each including a portion arranged to be disposed in a single complementary opening in a support member; and three mounting members, one each arranged to be disposed on either side of said first device and second device and one arranged to be disposed therebetween, said mounting members including first portions arranged to be located forward of and to span the opening in and to engage a surface of the support member and further including second portions arranged to be disposed through the opening in and rearward of the support member; mounting tabs and openings associated with opposite side walls of said devices and the second portions of said mounting members, the openings and mounting tabs being detented with respect to each other so as to provide a unitary structure comprised of said devices and said mounting members; the unitary structure including detent means arranged to engage the opening in the support member with the unitary structure disposed therein to thereby resiliently secure the unitary structure to the support member.

7. In a mounting arrangement, the combination comprising: a first electrical device and a second electrical device arranged to be disposed adjacent each other and each including a portion arranged to be disposed in a single complementary opening in a support member; and mounting means including a mounting member arranged to be disposed between said first device and said second device; locating means provided by said mounting member and the side walls of said devices adjacent thereto for positioning and resiliently fastening said devices one with respect to the other so as to provide a unitary structure comprised of said devices and said mounting member, further locating means associated with the unitary structure arranged to be disposed forward of and to span the opening in and to engage a surface of the support member; said unitary structure including detent means arranged to engage the opening in the support member with the unitary structure disposed therein to thereby resiliently secure the unitary structure to the support member.

8. In a mounting arrangement, the combination comprising: a first electrical device and a second electrical device arranged to be disposed adjacent to each other and each including a portion arranged to be disposed in a single complementary opening in a support member; means disposed between said first device and said second device for resiliently fastening said first device and said second device together so as to provide a unitary structure; locating means associated with the unitary structure arranged to be disposed forward of and to span the opening in and to engage a surface of the support member; said unitary structure including detent means arranged to engage the opening in the support member with the unitary structure disposed therein to thereby resiliently secure the unitary structure to the support member.

References Cited in the file of this patent

UNITED STATES PATENTS

| | | |
|---|---|---|
| 2,201,743 | Peterson | May 21, 1940 |
| 2,223,673 | Catron | Dec. 3, 1940 |
| 2,863,028 | Fraser | Dec. 2, 1958 |
| 2,904,662 | Spring | Sept. 15, 1959 |
| 2,935,653 | Campe | May 3, 1960 |